C. G. VON BONHORST.
DENTAL APPLICATOR FOR ANAESTHETICS.

No. 172,209. Patented Jan. 11, 1876.

Witnesses:
Alex Mahon
John G. Center

Inventor:
C. G. Von Bonhorst
by A. M. Smith
Attorney.

UNITED STATES PATENT OFFICE.

CHARLES G. VON BONHORST, OF LANCASTER, OHIO.

IMPROVEMENT IN DENTAL APPLICATOR FOR ANÆSTHETICS.

Specification forming part of Letters Patent No. 172,209, dated January 11, 1876; application filed December 14, 1875.

*To all whom it may concern:*

Be it known that I, CHARLES G. VON BONHORST, of Lancaster, county of Fairfield, State of Ohio, have invented certain new and useful Improvements in Dental Instruments for producing local anæsthesia, and which I denominate an "Applicator," of which the following is a full, clear, and exact description, reference being had to the accompanying drawing, making part of this specification, in which—

Figure 1:
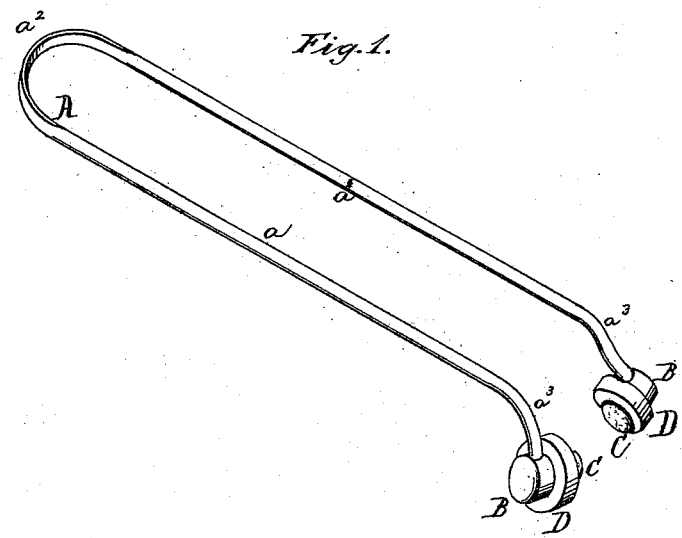
Figure 2:
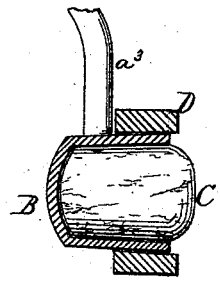

Figure 1 represents a perspective view of my improved dental instrument; and Fig. 2 is a sectional view of one of the cups for containing the anæsthetic agent, showing the arrangement of the sponge and the rubber band or ring.

Similar letters of reference denote corresponding parts in both figures.

My invention consists in a novel instrument for making local application of anæsthetic agents to the gums of the mouth, or to that portion thereof embracing the tooth to be operated upon or extracted, in such a manner as to confine the action of the anæsthetic, as far as practicable, thereto, as hereinafter described.

In the accompanying drawings, A represents an elastic bow, consisting of two arms, $a$ $a'$, placed parallel with each other, or nearly so, and united at one end by a curved or U-shaped spring, $a^2$; or, if preferred, the arms themselves may be made elastic, and the desired result attained, as hereinafter explained. The opposite ends, $a^3$, of these arms are bent at an angle of forty-five degrees, more or less, to the main portions $a$ $a^1$, and these angular ends are provided each with a cup, B, open on their inner adjacent ends or faces, and with said faces set diverging from each other at an angle (as nearly as may be) about equal to the ordinary divergence of the opposite sides of the gums from each other. Within the cups are placed sponges C, or other equivalent or suitable material, adapted to be saturated by, and to hold, the liquid anæsthetic employed, and surrounding the open mouth of each cup is a ring of rubber, D, or other soft or yielding material, which projects slightly beyond the inner open ends of the cups, and yields to pressure upon the gums, conforming to the shape thereof, at the same time shielding them from the edges of the cups B.

The manner of applying the anæsthetic is as follows: When a tooth is to be extracted or operated upon, the cups B B are filled with any preferred anæsthetic agent, which is absorbed, and prevented from being spilled, by the sponges C C, which protrude slightly from the open mouths of the cups, as shown. Thus prepared the instrument is applied to the mouth, with the cups B B placed upon opposite sides of the gum of the tooth to be operated upon, clasping it between them until by evaporation or absorption by the gums the desired anæsthetic action is produced, when the instrument is withdrawn, and the forceps can be applied and the tooth extracted without pain to the patient.

The bands or rings D not only protect the gums from the cups B, but they effectually serve to guard against the extension of the anæsthetic action, and prevent the tongue, lips, and cheek from coming in direct contact with the agent employed for producing such action, thereby obviating the discomfort frequently arising from the use of the spray or atomizing machines, which fill the mouth, and tend to strangle the patient, and, also, the after unpleasant sloughing of the gums frequently consequent upon the employment of instruments and agents for freezing the same.

The form of the cylinders or cups B may be changed, and simply absorbent pads may be employed upon flat plates, surrounded by the protecting-rings D; but the form substantially as shown and described is preferred, as these provide for the ready renewal of the sponge, or its equivalent, and also for the retention of the rings D, which may be readily removed, cleansed, and replaced or renewed, as desired.

Having now described my invention, what I claim as new, and desire to secure by Letters Patent, is—

1. The double handle A, consisting of the arms $a$ $a^1$, united by the spring $a^2$, and provided with the independent opposing cups B B, for holding and applying the anæsthetic agent to the gums, substantially as and for the purpose set forth.

2. The bow-handle A, provided with the cups B B, in combination with the sponges C C, or their equivalent, applied and operating as described.

3. The combination, with the cups or pads B B, of the elastic rings or bands D D, substantially as and for the purpose set forth.

CHARLES G. VON BONHORST.

Witnesses:
WM. F. MITCHELL,
THOS. H. WHITE.